(12) United States Patent
Enomoto et al.

(10) Patent No.: US 7,460,156 B2
(45) Date of Patent: Dec. 2, 2008

(54) SIGNAL TRANSMISSION METHOD BETWEEN TELEVISION CAMERA AND VIDEO APPARATUS AND APPARATUS USING THE METHOD

(75) Inventors: Kazuhito Enomoto, Kodaira (JP);
Nobuaki Fujimura, Kokubunji (JP);
Kazuhisa Yoshihara, Kodaira (JP);
Katsumasa Ueno, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 809 days.

(21) Appl. No.: 10/801,703

(22) Filed: Mar. 17, 2004

(65) Prior Publication Data
US 2004/0183916 A1  Sep. 23, 2004

(30) Foreign Application Priority Data
Mar. 19, 2003  (JP)  ............................. 2003-075779

(51) Int. Cl.
*H04N 5/232* (2006.01)
(52) U.S. Cl. .................................. 348/211.5; 348/207.1
(58) Field of Classification Search ................. 370/498, 370/535, 466, 465, 458; 348/211.9, 73, 211.8, 348/211.5, 143, 211.3, 211.4, 207.99, 423
See application file for complete search history.

(56) References Cited

U.S. PATENT DOCUMENTS

| | | | | |
|---|---|---|---|---|
| 5,479,206 A | * | 12/1995 | Ueno et al. | ............... 348/211.5 |
| 6,009,305 A | * | 12/1999 | Murata | ....................... 725/114 |
| 6,084,631 A | * | 7/2000 | Tonkin et al. | ............. 348/211.6 |
| 7,131,136 B2 | * | 10/2006 | Monroe | ....................... 725/105 |
| 2003/0071799 A1 | * | 4/2003 | Myers | .......................... 345/204 |

FOREIGN PATENT DOCUMENTS

| | | |
|---|---|---|
| JP | 05260398 | 10/1993 |
| JP | 7203399 | 8/1995 |
| JP | 7322238 | 12/1995 |
| JP | 8125903 | 5/1996 |
| JP | 10042176 | 2/1998 |
| JP | 11098402 | 4/1999 |
| JP | 2000078440 | 3/2000 |
| JP | 2002199359 | 7/2002 |
| JP | 2002335453 | 11/2002 |

OTHER PUBLICATIONS

"Camera Link, Specifications of the Camera Link Interface Standard for Digital Cameras and Frame Grabbers", Oct. 2000.
"Specifications of the Camera Link Interface Standard for Digital Cameras and Frame Grabbers", Camera Link, Oct. 2000, pp. 1-1 thru5-3 and A-1 thru D-3.

\* cited by examiner

*Primary Examiner*—Lin Ye
*Assistant Examiner*—Nelson D Hernández Hernández
(74) *Attorney, Agent, or Firm*—Mattingly, Stanger, Malur & Brundidge, P.C.

(57) ABSTRACT

A method and apparatus for transmitting a signal between a television camera and a video apparatus. When time-division multiplexing parallel image signals and transmitting them as a serial signal from the camera side to the video apparatus side, a control signal destined from the camera to the video apparatus is also time-division multiplexed. Furthermore, a plurality of kinds of trigger signals may be time-division multiplexed into one serial signal and transmitted from the video apparatus to the camera.

23 Claims, 9 Drawing Sheets

| PIN No. | SIGNAL | PIN No. | SIGNAL |
|---|---|---|---|
| 1 | +12V | 8 | +12V |
| 2 | GND | 9 | GND |
| 3 | X0- | 10 | X0+ |
| 4 | X1- | 11 | X1+ |
| 5 | XCLK- | 12 | XCLK+ |
| 6 | SerTC- | 13 | SerTC+ |
| 7 | CC1- | 14 | CC1+ |

CC1: TRIGGER SIGNAL (CAMERA INPUT)
SerTC: EXTERNAL CONTROL SIGNAL (CAMERA INPUT)

FIG.7

| PIN No. | | SIGNAL | PIN No. | | SIGNAL |
|---|---|---|---|---|---|
| CAMERA SIDE | IMAGE APPARATUS SIDE | | CAMERA SIDE | IMAGE APPARATUS SIDE | |
| 1 | 1 | GND | 14 | 14 | GND |
| 2 | 25 | X0− | 15 | 12 | X0+ |
| 3 | 24 | X1− | 16 | 11 | X1+ |
| 4 | 23 | X2− | 17 | 10 | X2+ |
| 5 | 22 | XCLK− | 18 | 9 | XCLK+ |
| 6 | 21 | X3− | 19 | 8 | X3+ |
| 7 | 20 | SerTC+ | 20 | 7 | SerTC− |
| 8 | 19 | SerTFG− | 21 | 6 | SerTFG+ |
| 9 | 18 | CC1− | 22 | 5 | CC1+ |
| 10 | 17 | CC2+ | 23 | 4 | CC2− |
| 11 | 16 | CC3− | 24 | 3 | CC3+ |
| 12 | 15 | CC4− | 25 | 2 | CC4− |
| 13 | 13 | GND | 26 | 26 | GND |

CC1~CC4: TRIGGER SIGNALS (CAMERA INPUT)
SerTC: EXTERNAL CONTROL SIGNAL (CAMERA INPUT)
SerTFG: EXTERNAL CONTROL SIGNAL (CAMERA OUTPUT)

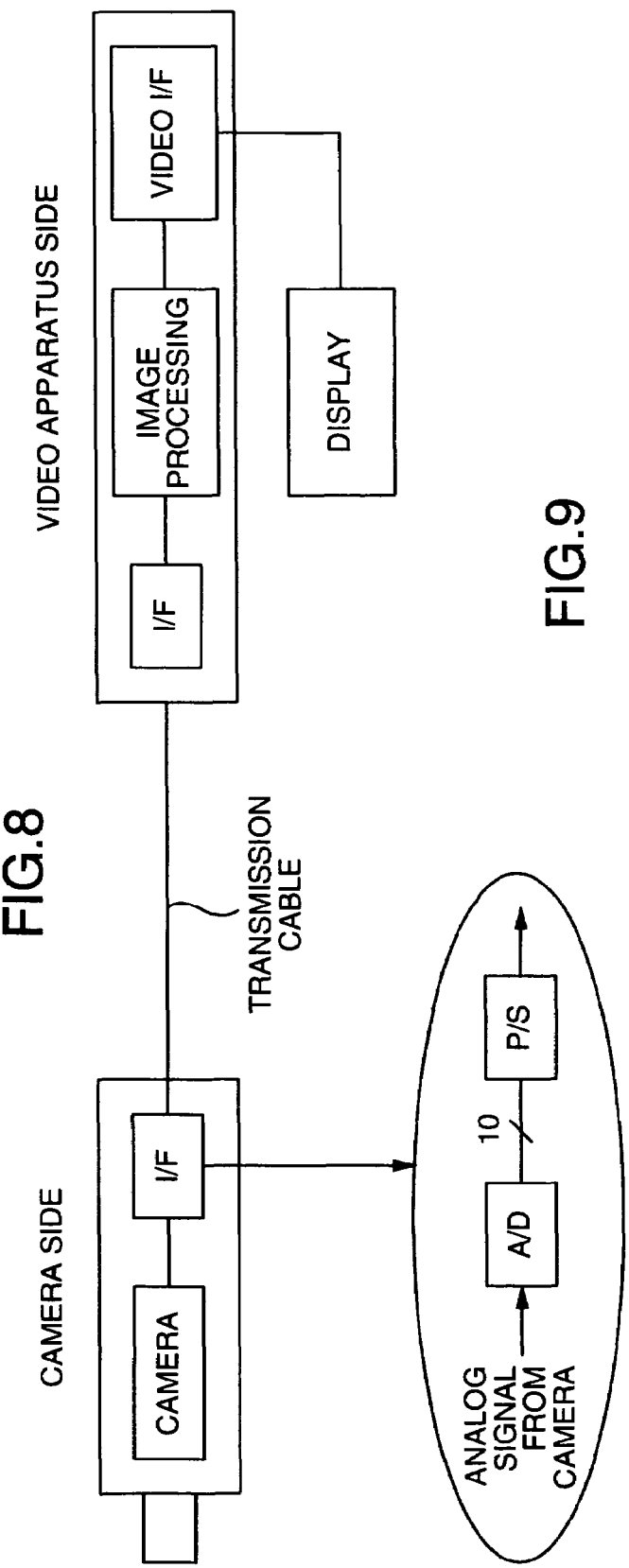
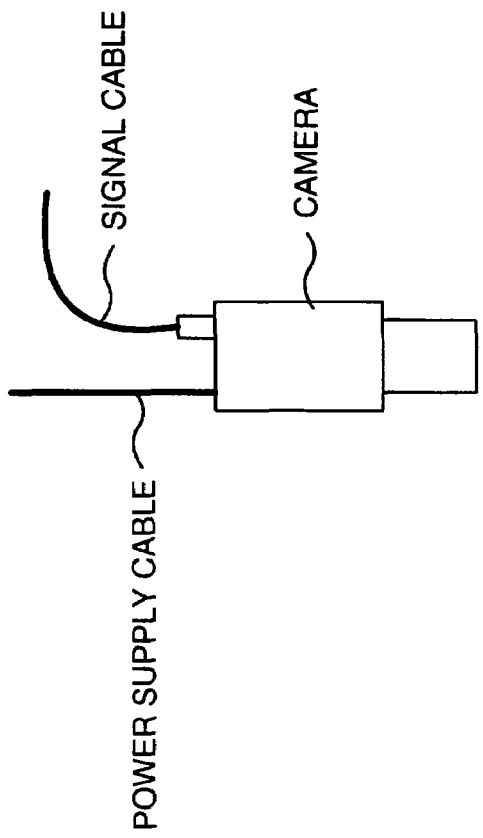

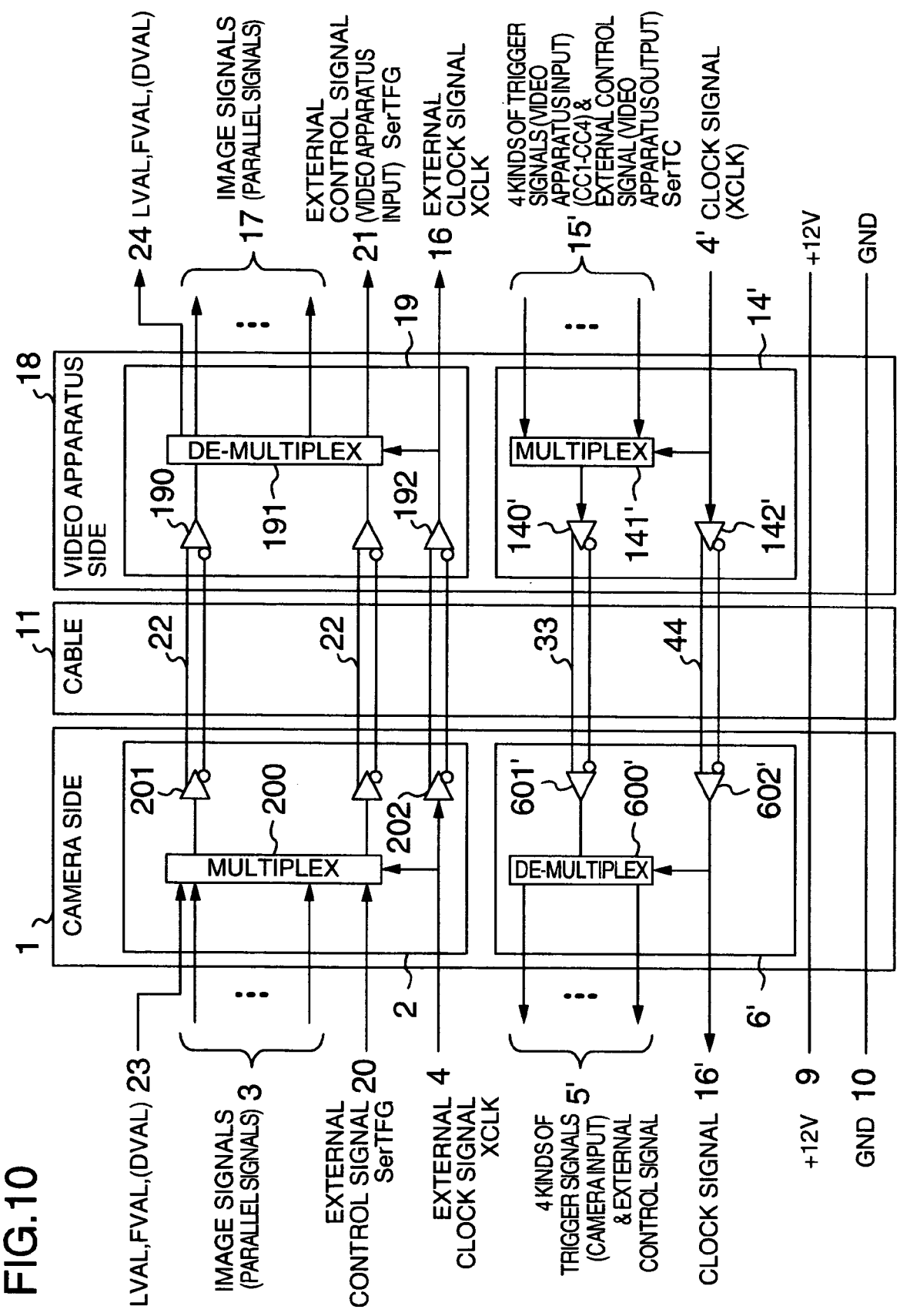

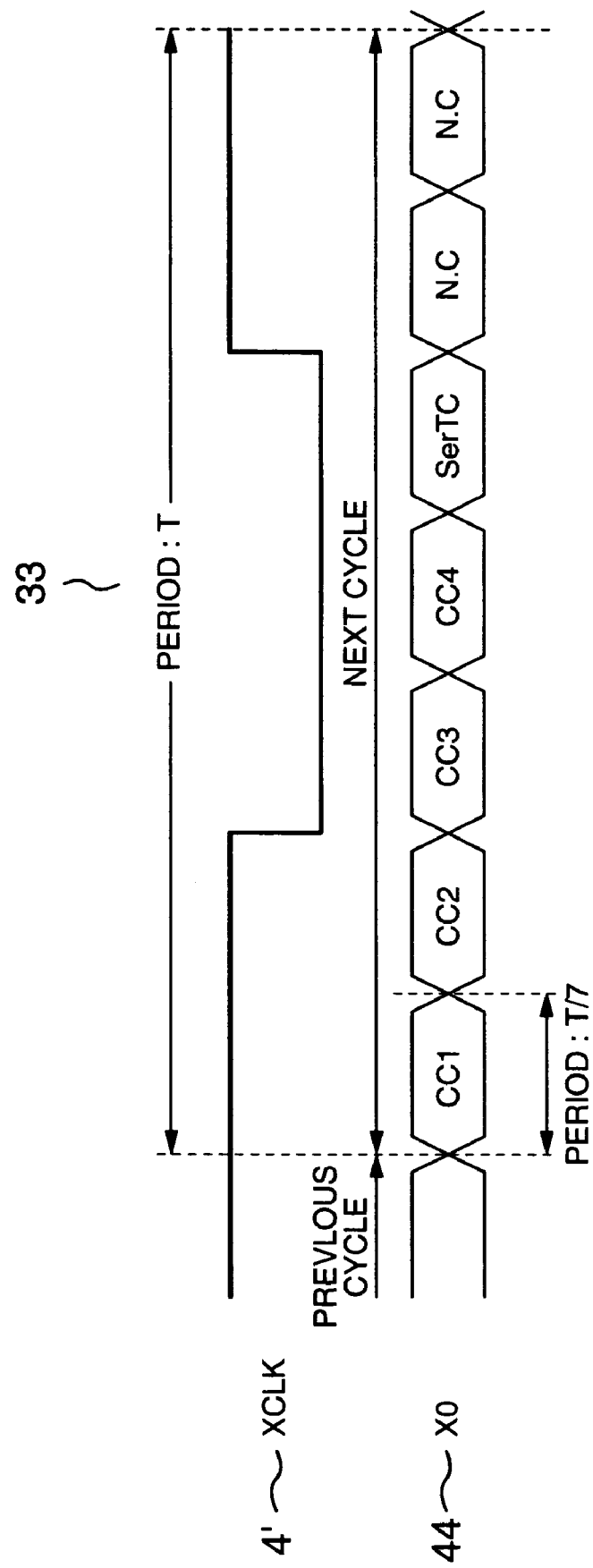

SIGNAL TRANSMISSION METHOD BETWEEN TELEVISION CAMERA AND VIDEO APPARATUS AND APPARATUS USING THE METHOD

BACKGROUND OF THE INVENTION

The present invention relates to a signal transmission technology and, more particularly to an improvement in a method and apparatus for signal transmission employed in a connection approach for transmission and reception of a video signal, a trigger signal, and a control signal between a television camera for picking up an image, especially, a television camera used in a field of factory automation (FA), and a video apparatus for processing a signal of an image picked up by this television camera.

For example, in a manufacturing factory, there is a case where to in-situ monitor a size error etc. of a certain part being manufactured, a television camera (hereinafter referred to as camera) is movably mounted at a predetermined monitor position along a moving path of the part so that each time the part passes by in front of the camera it may be exposed for a predetermined lapse of time at a timing instructed from a separately installed video apparatus to perform image processing on thus obtained image data by using the video apparatus, thereby measuring a processed size of this part or displaying it on a display apparatus.

FIG. 8 is a conceptual diagram for showing a configuration example of a video system used in such a case. On the side of a camera, at an interface, first an analog video signal sent from the camera is converted into a digital signal of, for example, 10 bits, which is then time-division multiplexed on four pairs of (eight) signal lines in a transmission cable and transmitted as a serial signal to the side of a video apparatus. In this case, digital data is time-division multiplexed on the four pairs of signal lines at, for example, ⅟7 of a period of a clock signal (which is transmitted from the camera side to the video apparatus side by using one pair of signal lines in the transmission cable), not shown, sent from the camera. The clock signal has a frequency of, for example, 30 MHz, so that one pixel of image data takes ⅟30 MHz to be transmitted. From the video apparatus side, a variety of camera-bound control signals such as a signal for instructing exposure timing are transmitted to the camera side through four to five pairs of signal lines in the transmission cable. It is to be noted that in transmission of these signals in the cable, to improve noise tolerance, a non-inverted signal and an inverted signal are transmitted in a pair by using a signal system referred to as a low voltage differential signaling (LVDS).

As an interfacing scheme employed in such a video system as described above, a television camera connection referred to as Camera Link is known, which connection is described in a literature "Camera Link, Specifications of the Camera Link Interface Standard for Digital Cameras and Frame Grabbers", October 2000. The disclosure of this literature is hereby incorporated by reference. According to "Camera Link" specifications, this Camera Link interface has three kinds of configurations of a base configuration, a medium configuration, and a full configuration as classified in accordance with image data quantity etc. of the camera. That is, since a single Channel Link chip is limited to 28 bits, some cameras may require several chips in order to transfer data efficiently, so that the following three kinds of configurations are prepared:

Base: 1 Channel Link Chip, 1 cable connector
Medium: 2 Channel Link chips, 2 cable connectors
Full: 3 Channel Link chips, 2 cable connectors

SUMMARY OF THE INVENTION

The following will describe the base configuration with reference to FIGS. 5-7. It is to be noted that the description is made in a case where data of an image picked up by a camera has a black-and-white (monochrome) 10-bit configuration (D0-D9) for each pixel.

FIG. 5 is a block diagram for outlining a transmission apparatus based on a Base configuration Camera link. This transmission apparatus comprises: a camera-side Camera link processing circuit 62; a video apparatus-side Camera link processing circuit 78; and a signal transmission cable for connecting these two processing circuits 62 and 78 to each other. Further, a power supply cable 84 for the camera is provided separately of the signal transmission cable 69. A power supply for the camera (e.g., +12V DC power supply) may be provided from the video apparatus. Alternatively, power may be supplied from an independently provided DC power supply.

Circuits 62 and 78 have: an image data transmission portion (data signal driver) 61 and an image data reception portion (data signal receiver) 76, a camera control signal transmission portion (camera control signal driver) 75 and a camera control signal reception portion (camera control signal receiver) 64, an external control signal transmission portion (external control signal driver) 72 and an external control signal reception portion (external control signal receiver) 66, an external control signal transmission portion (external control signal driver) 72', and an external control signal reception portion (external control signal receiver) 66'.

The image data transmission portion 61 timer-division multiplexes video signal 60s, which are parallel signals, sent from the camera and LVAL, FVAL, and DVAL signals regulated by the Camera Link specifications so that they may be serial signals (four pairs) having one seventh of a period (T) of an Camera Link external clock signal 63 and transmits them through the transmission cable 69 to the video apparatus-side image data reception portion 76. Further, the Camera Link external clock signal 63 is also transmitted from the image data transmission portion 61 through the cable 69 to the image data reception portion 76 and received as a Camera Link external clock signal 74.

The video apparatus side recovers from transmitted four pairs of image signals (serial signals) and LVA, FVAL, and DVAL signals 79 original 10-bit image signals (parallel signals) 77 and LVAL, FVAL, and DVAL signals 82 by using the data signal receiver 76 and then, by using the Camera Link external clock 74, performs image processing on these image signals.

LVAL, FVAL, and DVAL are Image Enable signals that are defined by the Camera Link specifications and transmitted on the cable 69 together with image data. These four Enable signals are defined as follows:

FVAL: Frame Valid (FVAL) is defined HIGH for valid lines.
LVAL: Line Valid (LVAL) is defined HIGH for valid pixels.
DVAL: Data valid (DVAL) is defined HIGHZ when data is valid.

It is possible to transmit four kinds of camera control signals (CC1, CC2, CC3, and CC4) 73 regulated by the Camera Link from the video apparatus side to the camera side. Each camera control signal is output as a differential signal from the camera control signal driver 75 in the video apparatus, transmitted through the transmission cable 69, and received by the camera-side camera control signal receiver 64, so that it may be used to perform processing that corresponds to contents of the received camera control signal. In this case, the control signals are transmitted as real-time differential signals which have not been time-division multiplexed. The camera control signal 73 can be used as a trigger signal which instructs the camera its pick-up timing or exposure time, for example.

Similarly, external control signals 68 and 71 are also transmitted by the external control signal drivers 72' and 72 respectively as real-time differential signals not time-division multiplexed and received by the external control signal receivers 66' and 66 as external control signals 70 and 67, respectively, to thereby perform transmission/reception of external control signals. It is to be noted that according to the Camera Link specification, the external control signals 68 and 70 are named SerTFG and defined as "Differential pair with serial communications to the frame grabber". Further, according to the Camera Link specifications, the external control signals 71 and 67 are named SerTC and defined as "Differential pair with serial communications to the camera".

FIG. 6 shows a data array in a case where an image signal (parallel signal) is converted into a serial signal and time-division multiplexed. The camera's 10-bit parallel signals (D0-D9), which correspond to the image signal 60 of FIG. 5, and LVAL, FVAL, and DVAL (in this case, N.C.) are converted into four pairs of serial signals (X0, X1, X2, and X3) 91-94 which have been time-division multiplexed. The data array when thus converted into the serial signals is in accordance with the Camera Link specifications. Further, a 1-bit period (data period 96) obtained upon conversion into the serial signals is set to a period 96, which is one seventh of a clock period (T) 95 of the Camera Link external clock signal (XCLK) 63. Note here that in FIG. 6, N.C. indicates that no signal is assigned.

Next, FIG. 7 shows connector pin assignments on a camera side and a video apparatus side of a transmission cable according to the Camera Link specifications. According to the base configuration in the Camera Link specifications, use of a 26-pin connector at both ends of the transmission cable and signal assignments for these pins is determined, so that a 26-core cable is necessary. It is to be noted that pins 1 and 14 are connected to an inner shield of the cable.

As described above, in this configuration, supply of a power to the camera and signal transmission are carried out through different cables. FIG. 9 shows a situation where the power supply cable and the signal transmission cable are connected to the camera.

As can be seen from FIG. 9, in a configuration of using two cables, the apparatus as a whole is troublesome to handle as compared to the case of using one cable. Further, since many signal lines are provided in the signal transmission cable, a cable diameter is large, for example, about 9 mm and the cable has less flexibility. Therefore, it has a problem that it is not applicable to a field which requires saved space and movability.

It is an object of the present invention to provide a signal transmission method which requires a reduced number of signal lines between a television camera and a video apparatus and an apparatus which uses the method.

It is another object of the present invention to provide a method for signal transmission between a television camera and a video apparatus that can use a more flexible cable which has a smaller diameter and an apparatus which uses the method.

It is a further object of the present invention to provide a method for signal transmission between a television camera and a video apparatus that can transmit signals and supply a power by using a relatively small diameter and, therefore, relatively flexible single cable and an apparatus which uses the method.

It is a still further object of the present invention to provide a method for signal transmission between a television camera and a video apparatus that can conduct control via a network by use of an IP signal, which is a communication signal in accordance with the Internet Protocol, which is a standard communication protocol for a computer network etc. and an apparatus which uses the method.

According to one aspect of the present invention, a method for signal transmission between a television camera and a video apparatus which are connected to each other through a transmission cable comprises the steps of:

multiplexing a video signal and a first control signal which are obtained from the television camera, by using a first time-division multiplexing circuit, to generate a first serial signal;

transmitting the first serial signal by using a predetermined first signal line in the cable;

transmitting a second control signal from the television camera to the video apparatus by using a predetermined second signal line in the cable;

separating the first serial signal obtained from the first signal line into a video signal and the first control signal by a first de-multiplexing circuit of the video apparatus; and transmitting third control signals from the video apparatus to the television camera by using third and fourth signal lines in the cable.

In one embodiment of the present invention, a total number of signal lines is reduced by generating a serial signal by time-division multiplexing not only a parallel video signal obtained from the camera but also control signals obtained from the camera together. These video signal and control signals can be time-division multiplexed together because they are transmitted in the same direction.

For the same reason, in one embodiment of the present invention, four trigger signals (camera control signals) and external control signals (SerTC) obtained from the video apparatus are together time-division multiplexed.

In one embodiment of the present invention, the signals are transmitted and power is supplied to the camera through a single cable.

Further, in one embodiment of the present invention, IP signals are transmitted as the external control signals (SerTC, SerTFG) so that the camera can be controlled over an LAN or a network such as the Internet. The IP signal used here may be based not only on IPv4 but also on IPv6.

Further, in one embodiment of the present invention, the external control signal is assigned to N.C. in pin assignments of the serial signal generated by time-division multiplexing.

Further, in one embodiment of the present invention, as the external control signals, signals in accordance with the RS-232C, RS-422, IEEE1394, or USB configurations are used.

BRIEF DESCRIPTION OF THE DRAWINGS

These and other objects and features as well as advantages of the present invention will become clear by the following description of preferred embodiments of the present invention with reference to the accompanying drawings, wherein:

FIG. 7 is a table for showing cable-connection connector pin assignments in the television camera connection system of FIG. 5;

FIG. 8 is a conceptual diagram for showing a configuration example of a video system related to the present invention;

FIG. 9 is an illustration for showing one example of a situation where a power supply cable and a signal transmission cable are connected to a camera;

FIG. 10 is a block diagram for showing a television camera connection system according to another embodiment of the present invention; and FIG. 11 is an illustration for showing a data array in a case where a parallel signal is time-division multiplexed into a serial signal in the television camera connection system of FIG. 10.

DESCRIPTION OF THE EMBODIMENTS

The following will describe embodiments of the present invention with reference to drawings. Note here that like components are indicated by like reference symbols.

Figure 1:
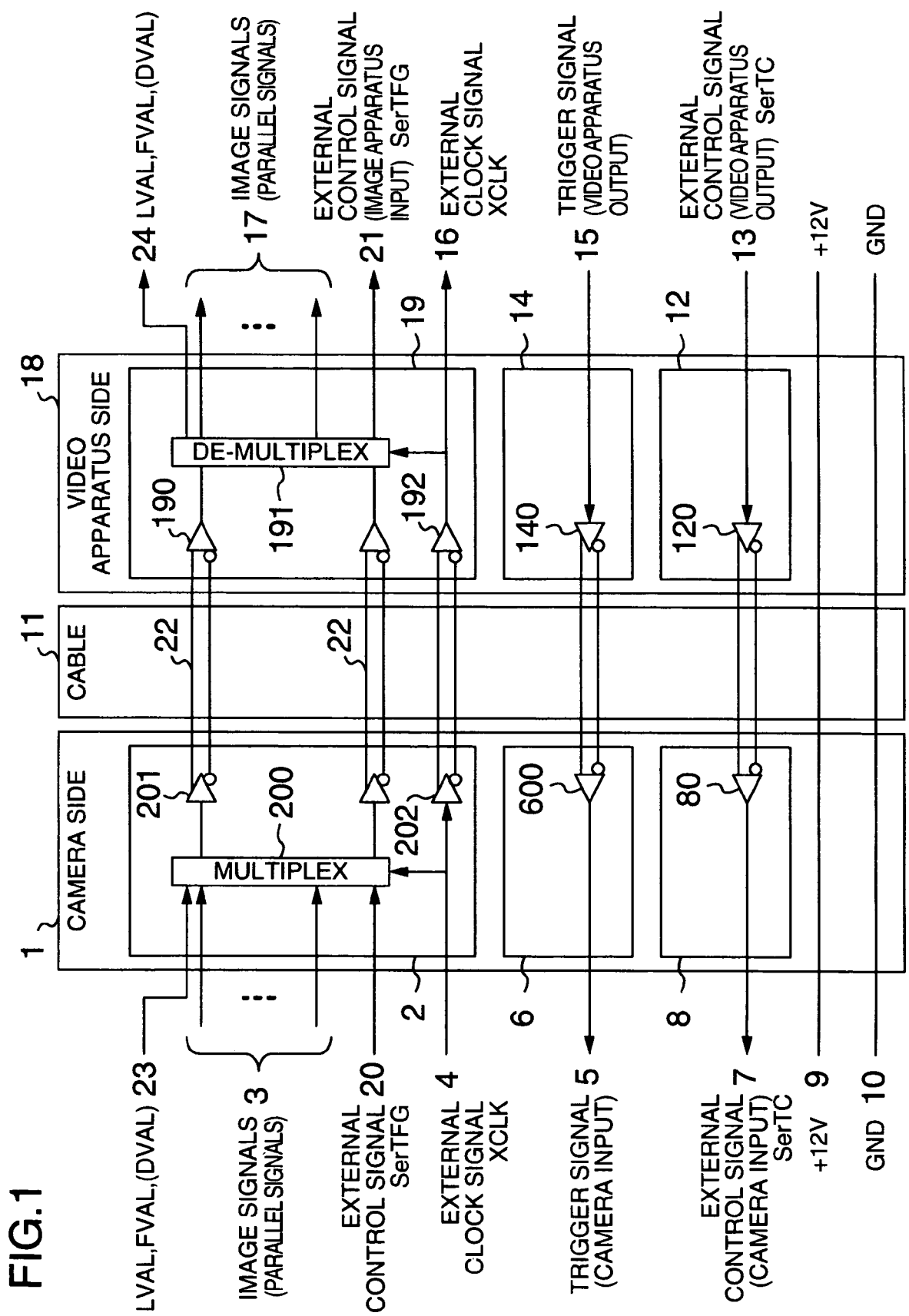
FIG. 1 is a block diagram for showing a television camera connection system according to one embodiment of a signal transmission method of the present invention.

FIG. 1 is a block diagram for showing a television camera connection system according to one embodiment of the present invention.

This camera connection system has a camera-side connection circuit 1, a video apparatus-side connection circuit 18, and a transmission cable 11 for connecting the circuit 1 and the circuit 18 to each other. A reference numeral 2 indicates an image data transmission portion in the camera-side connection circuit 1, reference numerals 19, 14, and 12 indicate an image data reception portion, a trigger signal transmission portion, and an external control signal transmission portion respectively in the video apparatus-side connection circuit 18, and reference numerals 6 and 8 indicate a trigger signal transmission portion and an external control signal reception portion respectively in the camera-side connection circuit 1. Reference numerals 9 and 12 indicate a power supply and a ground (GND) respectively.

The image data transmission portion 2 is equipped with a time-division multiplexing circuit 200 and two drivers 201, by which parallel image signals 3 and LVAL and FVAL signals (DVAL signal, which can also be transmitted, is set to N.C. in the present embodiment), which are obtained from the camera side and an external control signal (SerTFG) 20 are time-division multiplexed so that they may each be assigned to either of two data signals on two image signals (serial signals) constituted of data signals having one seventh of a clock signal period (T) of an external clock signal (XCLK) 4 and transmitted to the video apparatus side through the transmission cable 11. The image data transmission portion 2 is further equipped with a driver 202 for transmitting an external clock signal to a receiver 192 on the video apparatus side in a non-multiplexed manner by using the cable 11. The drivers 201 and 202 are arranged to create a differential signal, so that an input signal for each driver is transmitted by using one pair of signal lines in a format of a non-inverted and an inverted signal. The time-division multiplexing circuit 200 and the drivers are well known in the art and their detailed description will be unnecessary.

The image data reception portion 19 in the video apparatus-side connection circuit 18 is equipped with two data signal receivers 190 and de-multiplexing circuits 191 for recovering from two pairs of differential signals (serial signals) 22 original 10-bit image signals (parallel signals) 17 and LVAL and FVAL signals and then performing image processing on the recovered image signal.

Further, the present embodiment is arranged to transmit one kind of a camera control signal 15 from the video apparatus side to the camera side; for example, it can transmit one kind of a trigger signal 15. The trigger signal transmission portion 14 is equipped with a driver 140 for receiving the trigger signal 15 and outputting a differential signal from the driver 140. This differential signal is transmitted through the cable 11 to the camera side. The camera-side trigger signal reception portion 6 is equipped with a receiver 600 for supplying the received trigger signal 5 to the camera side. In response to this trigger signal, the camera side controls on, for example, a camera exposure time, an exposure start time, a picked-up image sampling (selecting) period, etc. The image sampling period refers to a period for scanning a necessary image portion in the picked up images. The trigger signal 5 is a single trigger signal in the present embodiment and transmitted as non-time-division multiplexed real-time signal. However, more than one kind of trigger signals can be sent in a time-division multiplexed manner, in which case there is given a merit that a plurality of kinds of signals can be transmitted even with one pair of signal lines used. This is described referring to another embodiment later.

An external control signal 13 to be transmitted from the video apparatus side to the camera side, similar to a trigger signal, is transmitted as a non-time-division multiplexed differential signal by the external control signal reception portion 12 having a video apparatus-side driver 120 and the external control signal reception portion 8 which has a camera-side receiver 80, so that an external control signal 7 is received by the camera side.

Furthermore, as described above, an external control signal (SerTFG) 20 to be transmitted from the camera side to the video apparatus side is also time-division multiplexed together with an image signal and LVAL and FVAL signals obtained as picked up by the camera. A signal thus time-division multiplexed is transmitted as the image signal (serial signal) 22 including the external control signal.

Although the external control signals 7, 13, 20, and 21 may be in accordance with the RS-232C, RS422, IEEE1394, or USB configurations, they are not limited thereto; for example, they can be transmitted and received as an IP signal so that a LAN or a network such as the Internet to which the camera and the video apparatus are connected may remote-control the camera by using IP protocol. The IP signal can be transmitted not only as an IPv4 IP signal but also as an IPv6 IP signal.

Further, in the present embodiment, the power supply 9 and a ground (GND) 10 are supplied from the video apparatus side to the camera side by using the transmission cable 11. This eliminates a necessity of preparing a cable for supplying power. Note here that power may be supplied from inside the video apparatus or an independent power supply may be provided on the video apparatus side.

Figure 2:
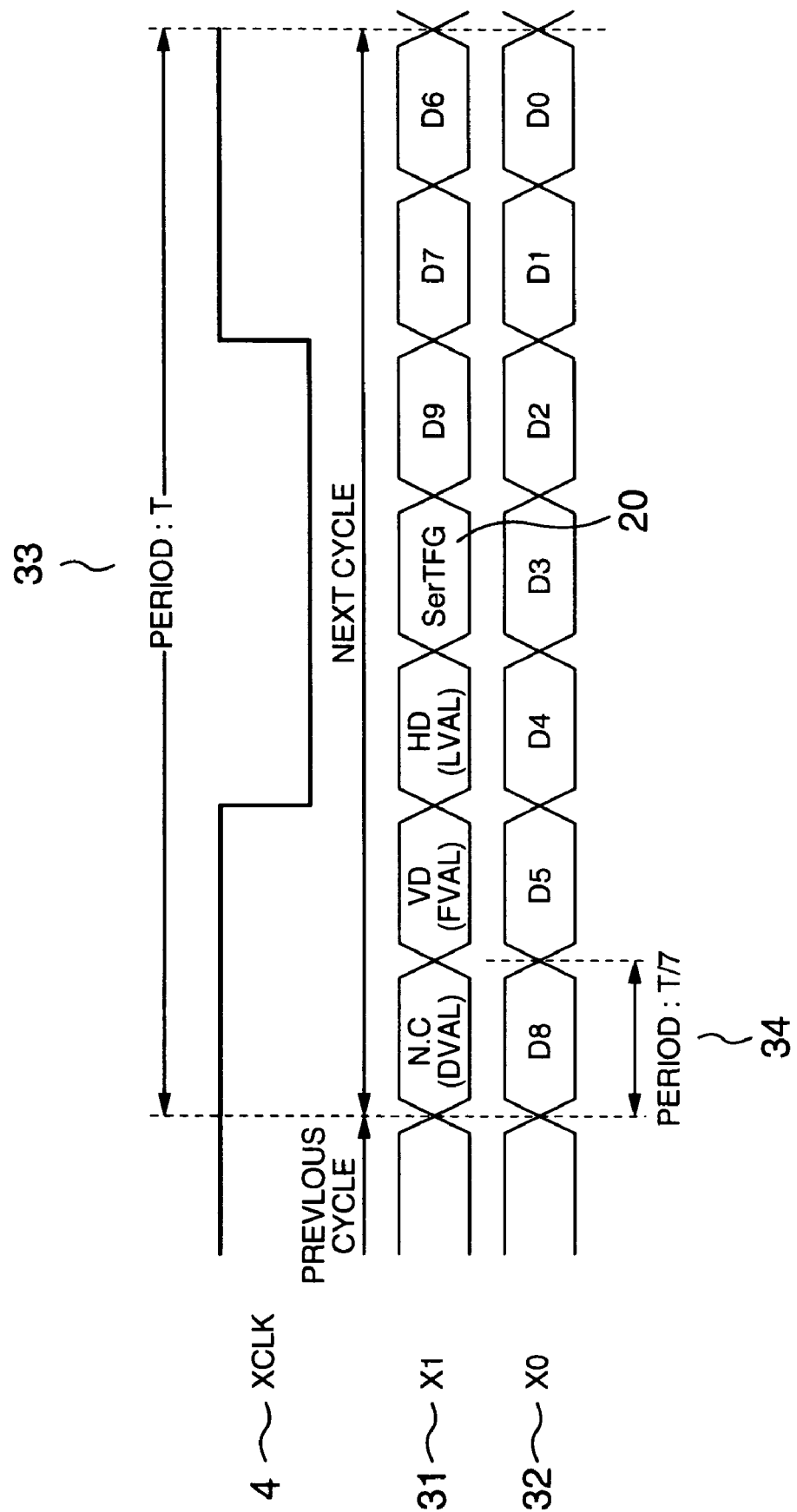
FIG. 2 is an illustration for showing a data array in a case where a parallel signal is time-division multiplexed into a serial signal in the television camera connection system of FIG. 1.

FIG. 2 showing data allocation in a case where image signals (parallel signals), FVAL, LVAL, (DVAL), an external control signal (SerTFG) are time-division multiplexed into a serial signal. The camera's 10-bit parallel signals (D0-D9) (image signals shown in FIG. 1) are time-division multiplexed into two pairs of serial signals (X0, X1) 32 and 31. X1 is further assigned FVAL, LVAL, and the external control signal (SerTFG). Note here that DVAL is not used in the present embodiment.

Figure 6:
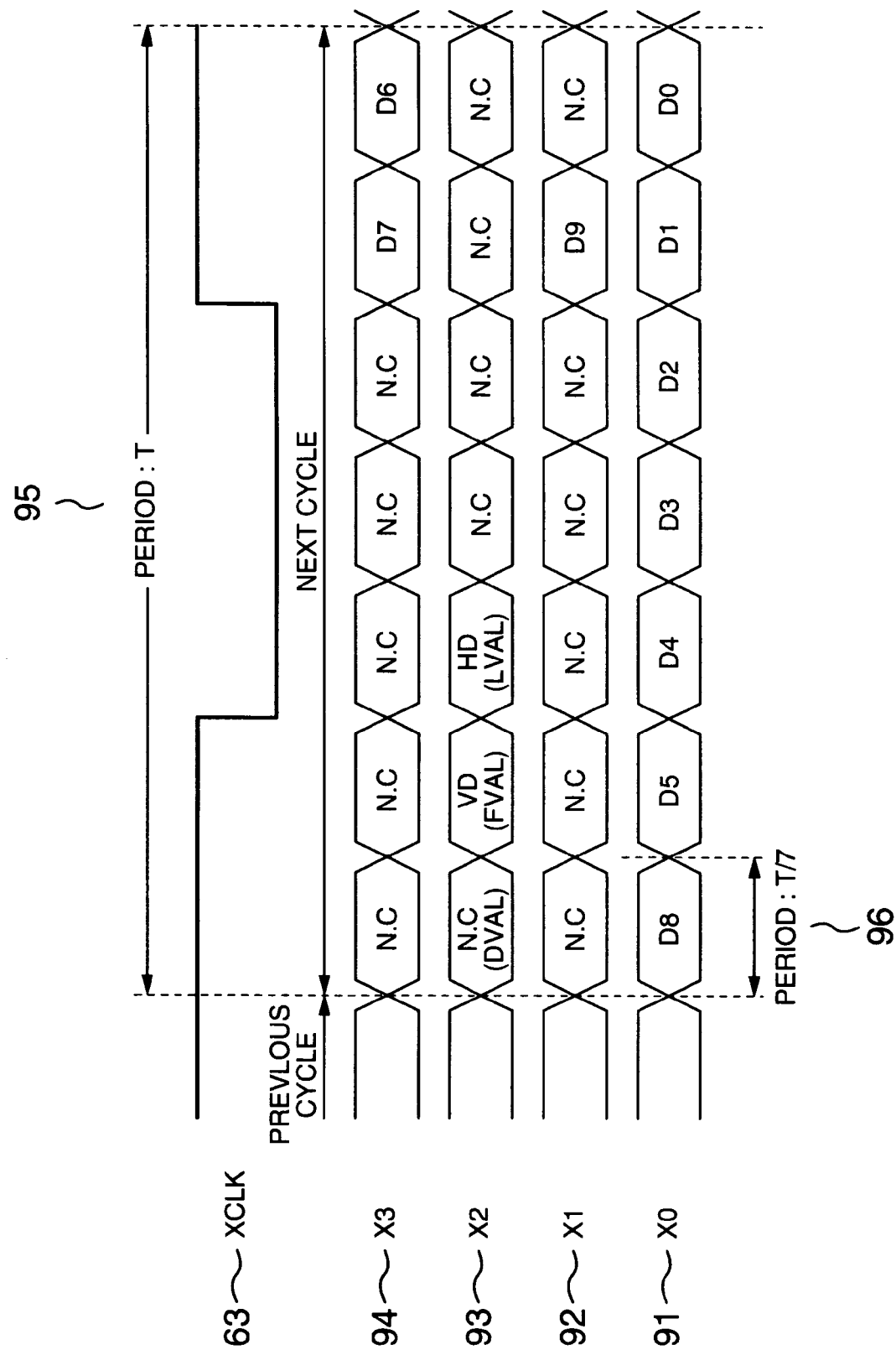
FIG. 6 is an illustration for showing a data array in a case where a parallel signal is time-division multiplexed into a serial signal in the television camera connection system of FIG. 5.

In the present embodiment, camera output data is allocated to N.C. (with no data allocated) portions in FIG. 6 so that data can be transmitted using two serial signals. Specifically, serial signals (X0, X2) 91 and 93 in FIG. 6 are used to arrange the signals D6, D7, and D9 in the N.C. portions. Note here that the serial signals (X0, X1) are used to transmit data in a transmission direction from the camera side to the video apparatus side. Therefore, in the present embodiment, the external control signal (SerTFG) 20 which transmits data from the camera side to the video apparatus similarly is also time-division multiplexed and assigned on the serial signal X2.

In such a manner, by including the external control signal 20 in the data transmission serial signal, it is not necessary to provide a separate external control signal, thereby enabling reducing the number of signal lines in the cable.

It is to be noted that the external control signals 7 and 13 are input to the camera side, so that the camera needs to be controlled on real time in a specific application. Therefore, these external control signals 7 and 13 are transmitted non-multiplexed in the present embodiment. However, in an application where not so rigid real-time property is required, it is possible to separately time-division multiplex these camera-bound external control signals themselves and transmit them, whose embodiment is described later.

FIG. 2 shows one example of data allocation in the present embodiment. However, data allocation is not limited to it; of course, a variety of data allocation forms may be possible. Further, when time-division multiplexing the 10-bit parallel signals (video signals 3 in FIG. 1) obtained from the camera side into two serial signals, their periods are given one seventh (T/7) of a period (T) 33 of the Camera Link external clock signal (XCLK) 4.

Figures 3, 4:
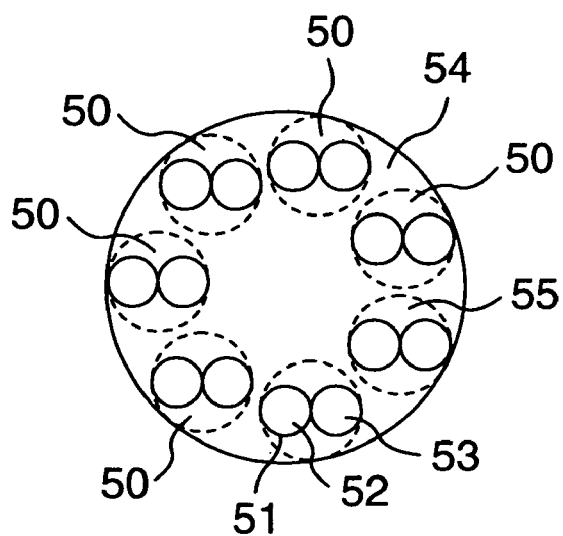
FIG. 3 is a table for showing one example of a connection pin array in the television camera connection system of FIG. 1.
FIG. 4 is an illustration for showing a configuration example of a cable which is used in the television camera connection system of FIG. 1.
Figure 5:
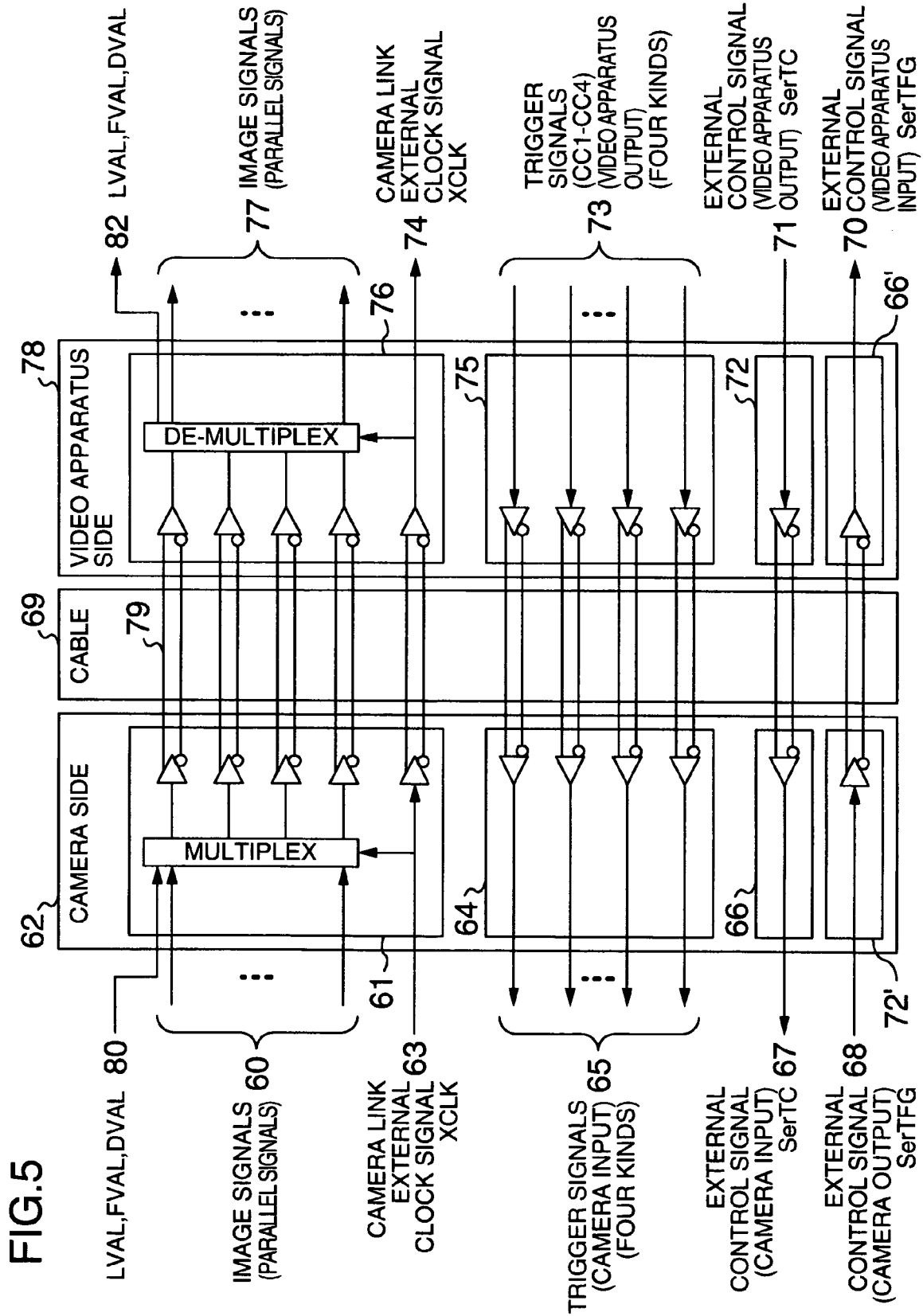
FIG. 5 is a block diagram for outlining a television camera connection system according to a Camera Link which was considered by the inventors in the process of achieving the present invention.

FIG. 3 shows one example of connector pin assignments related to the present embodiment. By reducing the number of image signals (serial signals) and those of the trigger signals and the external control signals, a 14-pin connector configuration is realized in the present embodiment. Note here that the connector pin assignments are just one example and, of course, any other various pin assignments are possible. Further, although the same pin assignments are employed on both the camera side and the video apparatus side, they may have different pin assignments.

FIG. 4 shows a configuration example of a cable which is used in the present embodiment. A power supply 52 and a GND 53 of a power-supply pair 51 may be larger in diameter than the other data signal pairs 50. Further, when an IP signal is used as an external control signal, an external control signal line pair 55 may be a cable (e.g., 100 base-T) which satisfies category 5 specifications.

FIG. 10 shows a block diagram of a television camera connection system according to another embodiment of the present invention. In this embodiment, the same one pair of signal lines as those in the embodiment of FIG. 1 are used to transmit four kinds of trigger signals.

The camera connection system of FIG. 10 employs the same approach of signal transmission from the camera side to the video apparatus side as that of FIG. 1 and its description is omitted, with only one exception of signal transmission from the video apparatus side to the camera side.

In FIG. 10, a reference numeral 14' indicates a trigger signal transmission portion and a reference numeral 6' indicates a trigger signal reception portion. The trigger signal transmission portion 14' and the trigger signal reception portion 6' are the same as the image signal transmission portion 2 and the image signal reception portion 19 respectively in function and configuration except for kinds and the number of signals to handle. The trigger signal transmission portion 14' is equipped with a time-division multiplexing circuit 141' and a driver 140, to receive four kinds of trigger signals (CC1-CC4) and an external control signal SerTC15' from the video apparatus and time-division multiplex them so that they may each be assigned to any of data portions on one signal (serial signal) constituted of data signals having one seventh of a clock signal period (T) of an external clock signal (XCLK) 4' and transmit them to the video apparatus side through the transmission cable 11. A driver 142' of the trigger transmission portion 14' transmits the external clock signal 4' as non-multiplexed to a receiver 602' on the video apparatus side by using the cable 11. The drivers 140' and 142' are arranged to generate differential signals 33 and 44 respectively and send received input signals in non-inverted and inverted signal formats by using one pair of signal lines each.

A trigger signal reception portion 6' is equipped with a trigger signal receiver 601' and a de-multiplexing circuit 600, to recover original four kinds of trigger signals (parallel signals) and an external control signal from the transmitted one pair of differential signals (serial signals) 33 and supply them to the camera side. Further, the reception portion 6' has a receiver 602' which reproduces an external clock signal 16' from the received differential signal 44 and supplies it to the camera side.

FIG. 11 shows one example of data allocation in the present embodiment. However, data allocation is not limited to it but, of course, may come in a variety of forms.

Although the present embodiment has somewhat worse real-time transmission properties of the trigger signal than the embodiment of FIG. 1, it has an advantage of being able to transmit more trigger signals than the number of trigger signals that can be transmitted in FIG. 1 by using the cables equivalent to those in the embodiment of FIG. 1.

As described above, according to the above embodiments, there is provided an advantage that the number of the cables between the camera and the video apparatus as well as the number of the cable signals can be reduced, thereby reducing the diameter of these cables. This advantage is especially effective in application to FA. That is, in FA, a camera is mounted movably in many cases, while a video apparatus is installed to an unmovable portion. In a case where cables of the above-mentioned embodiment are used, even if a gap between these movable portion and unmovable portion becomes large and small during the operation of the camera, the cables can be wired around easily between these movable camera and the unmovable portion, to suppress a possibility that various problem occur due to use of thick cables or many cables, thereby picking up images under more flexible pick-up conditions.

Although the embodiments have been described, the present invention is not limited to them and it is cleat to those in the art that they may be changed and modified variously within a spirit and a scope of the appended claims of the present invention.

What is claimed is:

1. A method for signal transmission between a television camera and a video apparatus which are connected to each other through a transmission cable, said method comprising the steps of:

time division multiplexing at said television camera a video signal and first control signals at a multiplexing period which is one-seventh (1/7) of a clock signal, by using a first time-division multiplexing circuit, to generate a first serial signal;

transmitting to said video apparatus said first serial signal in a form of first differential signals by using a predetermined first pair of signal lines in said cable;

transmitting said clock signal from said television camera to said video apparatus in a form of second differential signals by using a predetermined second pair of signal lines in said cable;

separating at a first time division de-multiplexing circuit of said video apparatus said first serial signal reproduced from said first differential signals from said first pair of signal lines into said video signal and said first control signals by using said clock signal reproduced from said second differential signals from said second pair of signal lines; and transmitting to said television camera second control signals in a form of third differential signals using a third pair of signal lines in said cable.

2. The method according to claim 1, wherein said first control signals include control signals used in said video apparatus and said second control signal includes a clock signal for said television camera.

3. The method according to claim 2, wherein said first control signal includes an IP signal.

4. The method according to claim 2, wherein said third control signals include a trigger signal and a control signal for controlling said television camera.

5. The method according to claim 4, wherein said control signal for controlling said television camera includes an IP signal.

6. An apparatus for signal transmission between a television camera and a video apparatus, comprising:

a first connection circuit which is connected to said television camera;

a second connection circuit which is connected to said video apparatus; and a transmission cable for electrically connecting said first connection circuit and said second connection circuit to each other, wherein said first connection circuit includes:

a first time-division multiplexing circuit for time division multiplexing an image signal from said television camera and first control signals at a multiplexing period which is one seventh (1/7) of a clock signal to convert said image signal and first control signals into a first serial signal, a first differential signal circuit for producing first differential signals of said first serial signal and a second differential signal circuit for producing second differential signals of said clock signal, wherein said second connection circuit includes:

a first differential signal receiver circuit for reproducing said first serial signal from said first differential signals, a second differential signal receiver circuit for reproducing said clock signal from said second differential signals, a first time division de-multiplexing circuit for time division de-multiplexing said time division multiplexed first serial signal, reproduced from said first differential signals by said first differential signal receiver circuit, into said image signal and said first control signals based on said clock signal reproduced from said second differential signals by said second differential signal receiver circuit, and a third differential signal circuit for producing third differential signals from a second control signal, wherein said transmission cable has a first pair of signal lines transmitting said first differential signals produced from said first serial signal, a second pair of signal lines for transmitting said second differential signals produced from said clock signal, and a third pair of signal lines for transmitting said third differential signals produced from said second control signal from said video apparatus to said television camera.

7. The apparatus according to claim 6, wherein said second connection circuit has means for transmitting a third control signal which controls said television camera from said video apparatus, wherein said first connection circuit has means for receiving said third control signal, and wherein said transmission cable further has a third signal line for transmitting said third control signal.

8. The apparatus according to claim 7, wherein said transmission cable further has a line for supplying power from said video apparatus to said television camera.

9. The apparatus according to claim 7, said third control signal includes a signal for controlling exposure time and/or exposure start time of said television camera.

10. The apparatus according to claim 7, wherein said third control signal includes a signal for controlling an image sampling period for images picked up by said television camera.

11. The apparatus according to claim 6, wherein said second connection circuit has a second time division multiplexing circuit for time-division multiplexing trigger signals obtained from said video apparatus into multiplexed tripper signals and transmitting said multiplexed trigger signals on said third signal line, and wherein said first connection circuit has a second time division de-multiplexing circuit for time division de-multiplexing said multiplexed trigger signal obtained from said third signal line.

12. A television camera apparatus for transmitting signals to a video apparatus comprising:

a camera unit which outputs a video signal and a first control signal for controlling said video apparatus; and an interface which time division multiplexes said video signal and said first control signal by using a time-division multiplexing circuit, wherein said time-division multiplexing circuit time division multiplexes said video signal and said first control signal at a multiplexing period which is one seventh (1/7) of a clock signal to convert said video signal and first control signal into a serial signal, wherein said interface includes:

a first differential signal circuit for producing first differential signals of said serial signal, and a second differential signal circuit for producing second differential signals of said clock signal, wherein said interface receives a second control signal, and transmits said first differential signals produced from said serial signal and said second differential signals produced from said clock signal to said video apparatus which time division de-multiplexes said serial signal reproduced from said first differential signals into said first control signal and said video signal based on said clock signal reproduced from said second differential signals.

13. The television camera according to claim 12, wherein said first control signal includes control signals used in said video apparatus and said second control signal includes a clock signal for said television camera.

14. The television camera according to claim 13, wherein said first control signal includes an IP signal.

15. The television camera according to claim 13, wherein said third control signals include a trigger signal and a control signal for controlling said camera unit.

16. The television camera according to claim 15, wherein said control signal for controlling said camera unit includes an IP signal.

17. The television camera according to claim 12, wherein said interface receives third control signals from said video apparatus for controlling said camera unit.

18. A method for transmission between a television camera apparatus and a video apparatus comprising the steps of:
outputting from a camera unit a video signal and a first control signal for controlling said video apparatus;
time division multiplexing said video signal and said first control signal by using a time-division multiplexing circuit into a serial signal,
wherein said time-division multiplexing circuit time division multiplexes said video signal and said first control signal at a multiplexing period which is one seventh (1/7) of a clock signal to convert said video signal and first control signal into said serial signal,
producing first differential signals of said serial signal by use of a first differential signal circuit;
producing second differential signals of said clock signal by use of a second differential signal circuit;
receiving a second control signal; and
transmitting said first differential signals produced from said serial signal and said second differential signals produced from said clock signal to said video apparatus which time division de-multiplexes said serial signal reproduced from said first differential signals into said first control signal and said video signal based on said clock signal reproduced from said second differential signals.

19. The method according to claim 18, wherein said first control signal includes control signals used in said video apparatus and said second control signal includes said clock signal for said television camera.

20. The method according to claim 19, wherein said first control signal includes an IP signal.

21. The method according to claim 19, further comprising the step of:
receiving third control signals from said video apparatus for controlling said camera unit.

22. The method according to claim 19, wherein said third control signals include a trigger signal and a control signal for controlling said camera unit.

23. The method according to claim 22, wherein said control signal for controlling said camera unit includes an IP signal.

* * * * *

UNITED STATES PATENT AND TRADEMARK OFFICE
CERTIFICATE OF CORRECTION

PATENT NO. : 7,460,156 B2
APPLICATION NO. : 10/801703
DATED : December 2, 2008
INVENTOR(S) : K. Enomoto et al.

Page 1 of 1

It is certified that error appears in the above-identified patent and that said Letters Patent is hereby corrected as shown below:

On the title page, item [73] should read,
-- (73) Assignee: Hitachi Kokusai Electric Inc., Tokyo (JP) --

Signed and Sealed this

Nineteenth Day of May, 2009

JOHN DOLL
*Acting Director of the United States Patent and Trademark Office*